(12) United States Patent
Kuntz

(10) Patent No.: US 6,860,300 B1
(45) Date of Patent: Mar. 1, 2005

(54) AIRCRAFT DEFUELING SYSTEM

(75) Inventor: James P. Kuntz, Spokane, WA (US)

(73) Assignee: Spokane Industries, Inc., Spokane, WA (US)

( * ) Notice: Subject to any disclaimer, the term of this patent is extended or adjusted under 35 U.S.C. 154(b) by 0 days.

(21) Appl. No.: 10/690,441

(22) Filed: Oct. 21, 2003

(51) Int. Cl.$^7$ ................................................ B65B 1/04
(52) U.S. Cl. ........................... 141/65; 141/98; 141/231; 184/1.5
(58) Field of Search ............................... 141/1, 7, 8, 65, 141/231, 98; 184/1.5, 106, 109

(56) References Cited

U.S. PATENT DOCUMENTS

| | | | | |
|---|---|---|---|---|
| 4,883,102 A | * | 11/1989 | Gabrielyan et al. ........... | 141/98 |
| 5,117,876 A | | 6/1992 | Kuntz ........................... | 141/65 |
| 5,492,144 A | * | 2/1996 | Kriewaldt ..................... | 137/205 |
| 5,878,799 A | * | 3/1999 | Hannick ........................ | 141/351 |
| 6,112,366 A | * | 9/2000 | Berfield ........................ | 15/352 |

* cited by examiner

Primary Examiner—Steven O. Douglas
(74) Attorney, Agent, or Firm—Holland & Hart

(57) ABSTRACT

An apparatus and method for defueling and aircraft. The apparatus includes a vacuum fuel tank comprising a first vacuum generator, a defueling hose in fluid communication with the vacuum fuel tank, a first defueling fitting attached to the first defueling hose, and a second vacuum generator operatively connected to the first defueling fitting. By providing both a first and a second vacuum generator, the defueling fitting can be attached and detached from an aircraft independent of the suction used to withdraw fuel from an aircraft. According to some embodiments, there may be multiple defueling hoses and additional vacuum generators. Further, some embodiments include a telescoping funnel that can be selectively isolated from the vacuum fuel tank so that the tank can be held at vacuum pressure.

30 Claims, 8 Drawing Sheets

AIRCRAFT DEFUELING SYSTEM

FIELD OF THE INVENTION

The present invention relates to aircraft equipment, and more particularly to an aircraft defueling system.

BACKGROUND OF THE INVENTION

One of the most commonly recognized difficulties associated with airplanes and other aircraft is fueling and defueling. Jet fuel, for example, is a flammable hydrocarbon liquid that can be ignited even in certain ambient conditions, primarily based on temperature and vapor concentration. The temperature at which the vapors of a flammable liquid can ignite is known as the "flash point." A hazardous vapor concentration is present when a fuel vapor reaches a level known as the lower flammability limit (LFL) or lower explosive limit (LEL). These limits are usually expressed as a percentage by volume. Fuels below the LFL/LEL are considered too lean to burn. If the fuel vapor concentration exceeds the upper flammability limit or upper explosive limit, the fuel is considered too rich to burn. A fuel vapor concentration between these two limits is considered to be in its flammable range and will ignite and burn if exposed to an ignition source.

In addition, hydrocarbons, including jet fuel, may also present toxic or irritant hazards. At high concentrations, jet fuel and other hydrocarbons can affect the nervous system, causing headache, dizziness, and lack of coordination. Exposure to some hydrocarbons may also cause skin irritations if not controlled. Therefore, it is desirable to prevent or minimize any fuel spills when fuelling or defueling an airplane.

Further, defueling a plane is common occurrence. It is often desirable to defuel an aircraft before taking an airplane out of service for maintenance or repair. Therefore, there are a number of airplane defueling systems currently available. However, most defueling systems include gravity draining, resulting in low flow rates and long drain times. In fact, for many large airplanes, depending on the amount of fuel remaining in the tanks, it can take up to seven hours or more to fully drain the fuel from the plane using a gravity dependent system.

Some more recent defueling systems include a vacuum assist to increase the rate of defueling. Vacuum assist defueling systems can evacuate airplane fuel tanks in a fraction of the time normally allocated to a gravity system. However, it is still desirable to reduce or eliminate releases of the aircraft fuel to atmosphere. Accordingly, there is currently a coupler described in U.S. Pat. No. 5,117,876, incorporated in its entirety by this reference, that taps into a main vacuum. The main vacuum provides vacuum pressure which is used to evacuate fuel tanks and seal the coupler to the aircraft drain valves. Thus, the coupler prevents the loss of any fuel to atmosphere, as long as the main vacuum is available. However, if the main vacuum is lost, the seal of the coupler is also compromised, and fuel can potentially leak. Therefore, there is a need for an aircraft-defueling system that minimizes the risk of fuel leaks, even when the main vacuum is not available.

SUMMARY OF THE INVENTION

The present invention provides an apparatus and method for defueling an aircraft. According to some embodiments, the apparatus includes a vacuum fuel tank comprising a first vacuum generator, a defueling hose in fluid communication with the vacuum fuel tank, a first defueling fitting attached to the first defueling hose, and a second vacuum generator operatively connected to the first defueling fitting. By providing both a first and second vacuum generator, the defueling fitting can be attached and detached from an aircraft independent of the suction used to withdraw fuel from an aircraft.

According to some embodiments, there may be multiple defueling hoses and additional vacuum generators. Further, some embodiments include a telescoping funnel that can be selectively isolated from the vacuum fuel tank so that the tank can be held at vacuum pressure.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

Throughout the drawings, identical reference numbers and descriptions indicate similar, but not necessarily identical elements.

DETAILED DESCRIPTION OF THE INVENTION

It is a common procedure to defuel an aircraft prior to storage, maintenance, or repair. Most aircraft include one or more drain valves at low points of the fuel tanks to facilitate defueling. The drain valves are usually spring loaded "poppet" valves that are opened by the application of a force normal to the spring force. There are a number of devices available for defueling aircraft, which are often generally referred to as "bowsers." Some aircraft defuelers include telescopic funnels that provide the defueler with an extended reach. The extended reach telescopic funnel facilitates defueling from drain valves that are located in particularly high places on some aircraft.

However, telescopic funnels are generally limited to direct gravity draining, which often results in a very long defueling interval. Further, previous telescopic funnel assemblies are open to and in constant fluid communication with the defueling tank. Therefore, previous aircraft defuelers are not capable of maintaining vacuum pressure inside the defueling tank. Any vacuum pressure applied would be lost through the open telescopic funnel. Accordingly, previous vacuum defueling systems that employ both the telescopic funnel and a vacuum withdrawal system have been limited to applying vacuum pressure to a defueling hose. In addition, as mentioned above, when vacuum pressure is lost, previous defueling fittings detach from the aircraft.

Therefore, the present invention involves an aircraft defueling apparatus and associated methods of defueling with features that reduce the risk of leaks. The present invention more specifically involves a defueling apparatus that provides multiple vacuum generators. According to the present invention, the multiple vacuum generators and telescopic funnel valving allow the holding tank to maintain vacuum pressure, and also provide independent suction to attach the defueling apparatus to the aircraft.

The defueling fitting described herein can be used with any aircraft, including without limitation fixed wing aircraft (airplanes) and rotary wing aircraft (helicopters). Such aircraft are normally provided with one or more flush or recess-mounted fuel drains in the wings and/or fuselage.

As used throughout the specification and claims, the term "plate" is used broadly to mean any object, the thickness of which is relatively small or shallow in comparison with the other dimensions of the item. A "plate" can also include a cup, especially a suction cup. "Circumference" means at or near a boundary line of a figure, area, or object. "Vacuum" means lower pressure than local atmospheric pressure, or a machine that is capable of reducing pressure. "Integral" means constituent or as a part of a whole, as opposed to separate parts that may be put together or may work together. The words "including" and "having," as used in the specification, including the claims, have the same meaning as the word "comprising."

Figure 1:
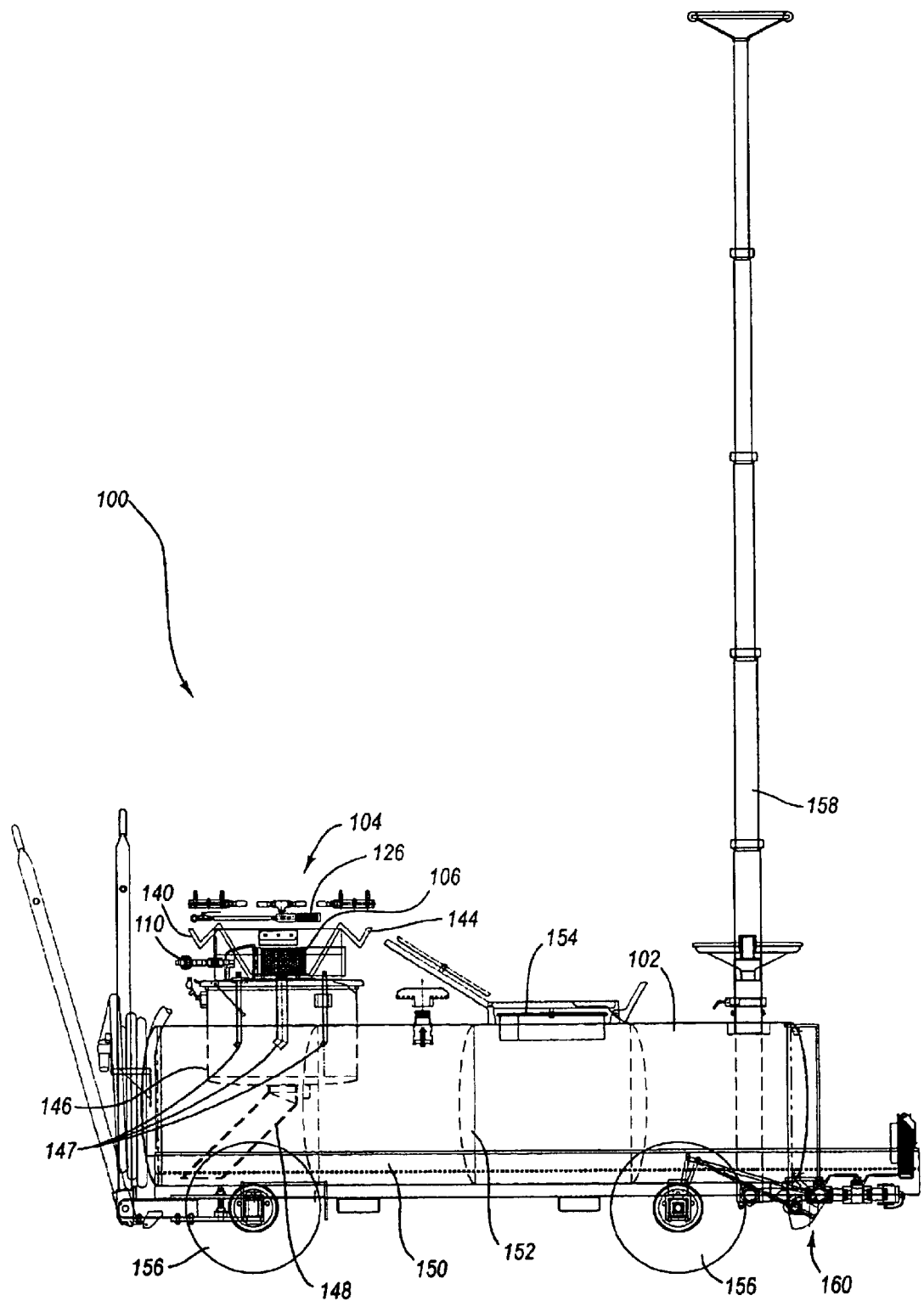
FIG. 1 is a side view of an aircraft defueling apparatus according to one embodiment of the present invention.
Figure 2:
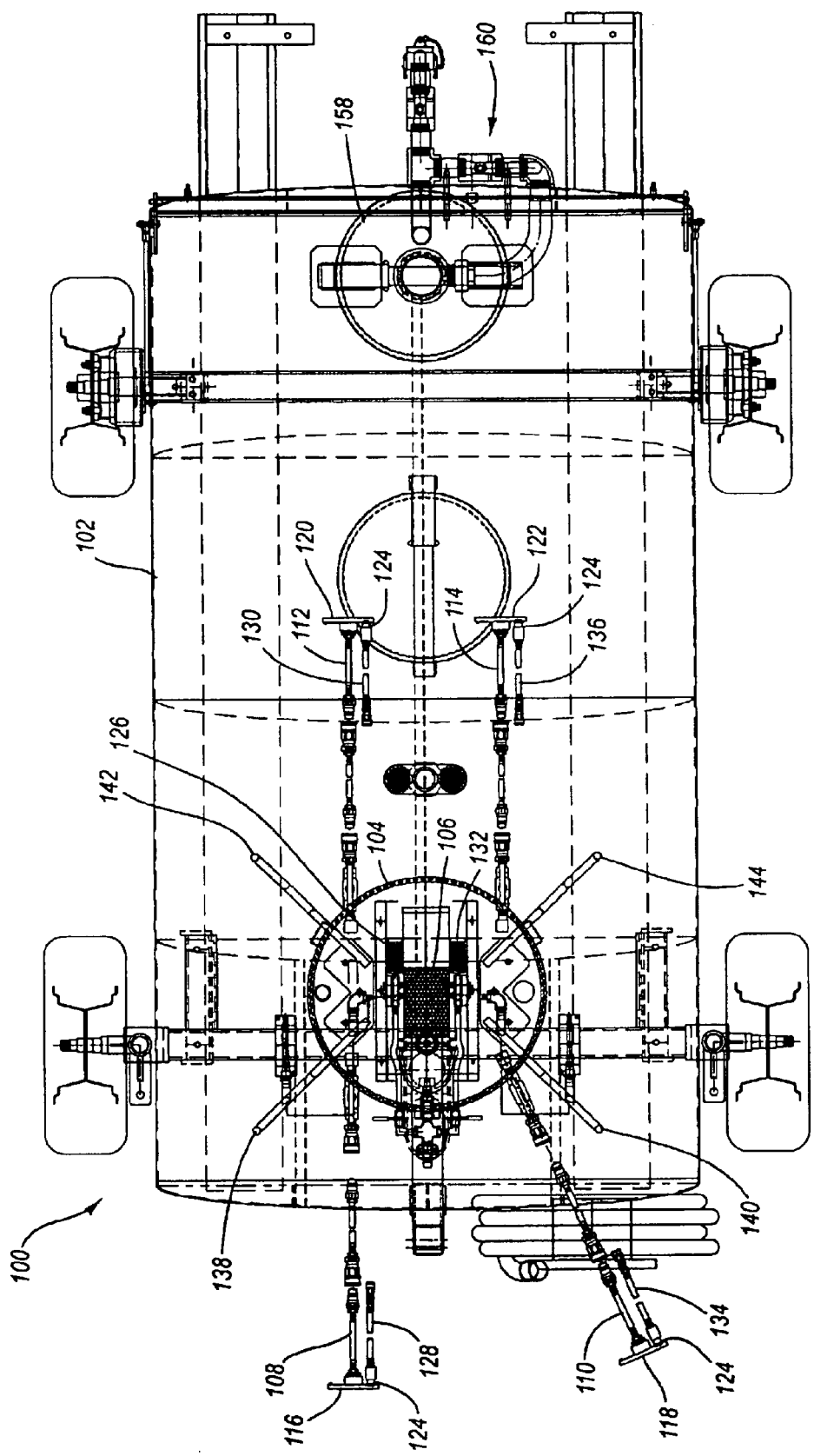
FIG. 2 is a top view of the aircraft defueling apparatus of FIG. 1 according to one embodiment of the present invention.

Turning now to the figures, and in particular to FIGS. 1–2, an aircraft defueling apparatus or bowser 100 is shown according to one embodiment of the present invention. The bowser 100 includes a holding tank. According to the embodiment shown, the holding tank is a vacuum fuel tank 102 and includes an integral vacuum assembly 104. However, according to some embodiments the vacuum assembly 104 is separate from the holding tank.

The vacuum assembly 104 includes a first vacuum generator 106. The first vacuum generator 106 provides vacuum pressure to the vacuum fuel tank 102. Therefore, the vacuum fuel tank 102 is itself at vacuum pressure when the first vacuum generator 106 is operating. The vacuum fuel tank 102 is in fluid communication with one or more defueling hoses. According to the embodiment of FIGS. 1–2, there are four defueling hoses 108, 110, 112, 114. Each of the defueling hoses 108, 110, 112, 114 is in fluid communication with the vacuum fuel tank 102, and thus each hose is subjected to the vacuum pressure provided by the first vacuum generator to draw fuel from aircraft fuel tanks. Further, the first defueling hose 108 is attached to an associated first defueling fitting 116 to facilitate attachment to and defueling of an aircraft. The first defueling fitting 116 is shown in more detail below with reference to FIG. 9 and may comprise a fitting similar or identical to the universal fitting described by U.S. Pat. No. 5,117,876 ("the '876 patent"), which is incorporated in its entirety by this reference. In addition, each of the other four defueling hoses 110, 112, 114 also includes an associated defueling fitting 118, 120, 122, respectively. However, other defueling fittings may also be used with the defueling hoses 108, 110, 112, 114 as the defueling fittings 116, 118, 120, 122 are not limited to the universal fitting shown in the figures or described by the '876 patent.

As mentioned above, the defueling fittings 116, 118, 120, 122 are connected to the defueling hoses 108, 110, 112, 114, and each of the defueling hoses 108, 110, 112, 114 is in fluid communication with the vacuum fuel tank 102. However, each of the defueling fittings 116, 118, 120, 122 include separate suction ports 124 operatively connected to vacuum sources separate from the first vacuum generator 106. For example, the first and third defueling fittings 116, 120 are operatively connected to a second vacuum generator 126 via first and third vacuum lines 128, 130, respectively. Similarly, the second and fourth defueling fittings 118, 122 are operatively connected to a third vacuum generator 132 via second and fourth vacuum lines 134, 136, respectively. Alternatively, the second and fourth defueling fittings 118, 122 may be connected to the second vacuum generator 126 and the third vacuum generator 132 may be omitted.

The second and third vacuum generators 126, 132 provide independent suction to the defueling fittings 116, 118, 120, 122. Accordingly, the defueling fittings may be suction-attached or hermetically attached to an aircraft adjacent a fuel drain valve independent of the operation of the first vacuum generator 106. Therefore, the defueling fittings 116, 118, 120, 122 can be attached to an aircraft prior to activating the first vacuum generator 106, which draws fuel through the fuel drain valve. Adequately sealing the defueling fittings 116, 118, 120, 122 to the aircraft prior to initiating fuel flow reduces the risk of fuel leaks. In addition, maintaining the connection of the defueling fittings 116, 118, 120, 122 for a period of time following deactivation of the first vacuum generator 106 also reduces the risk of fuel leaks. Moreover, if for any reason the first vacuum generator is deactivated during a defueling operation, the defueling fittings 116, 118, 120, 122, remain attached to the aircraft, preventing leaks.

Figure 3:
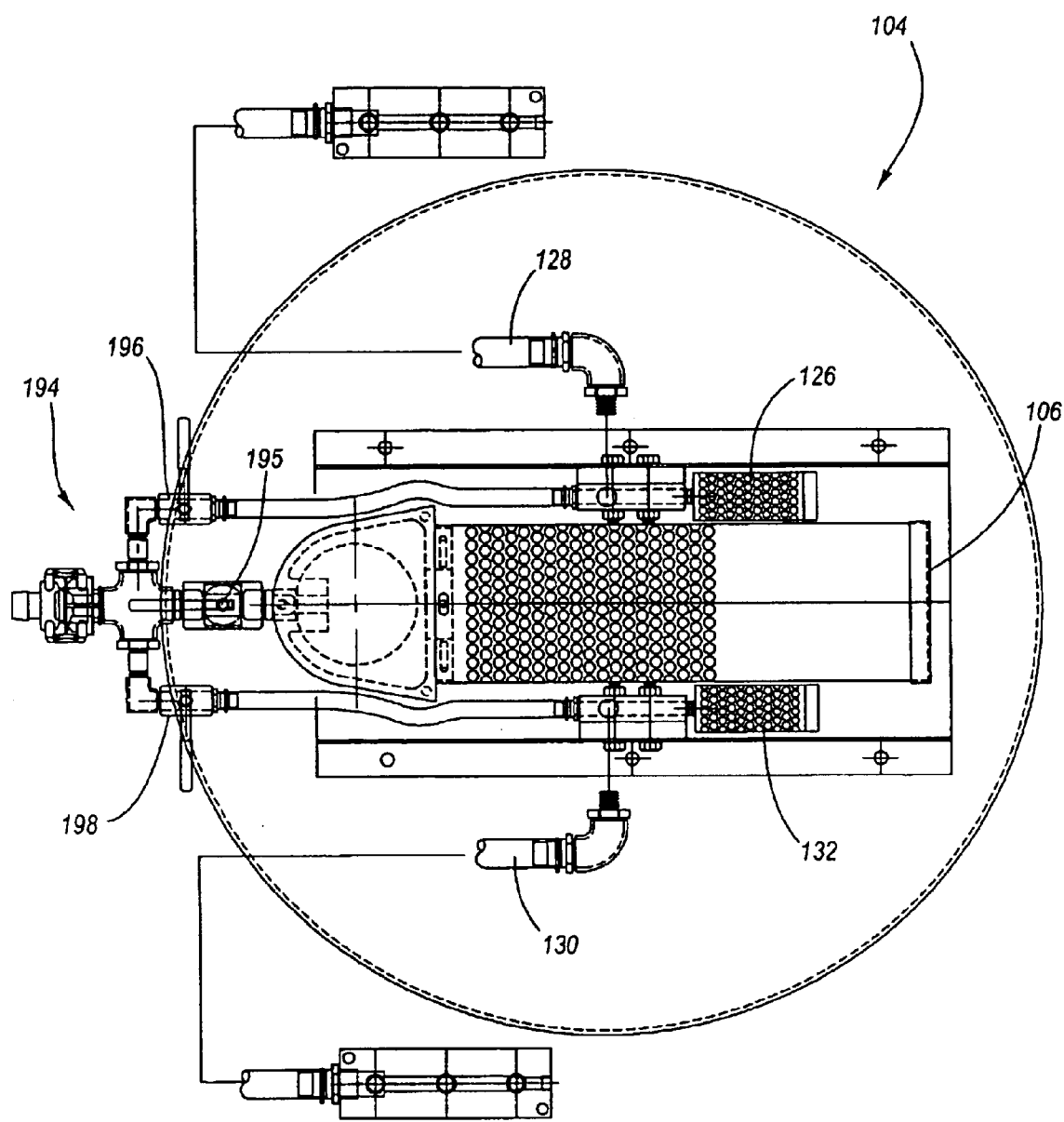
FIG. 3 is a top view detail of a vacuum assembly shown in FIG. 1 according to one embodiment of the present invention.
Figure 4:
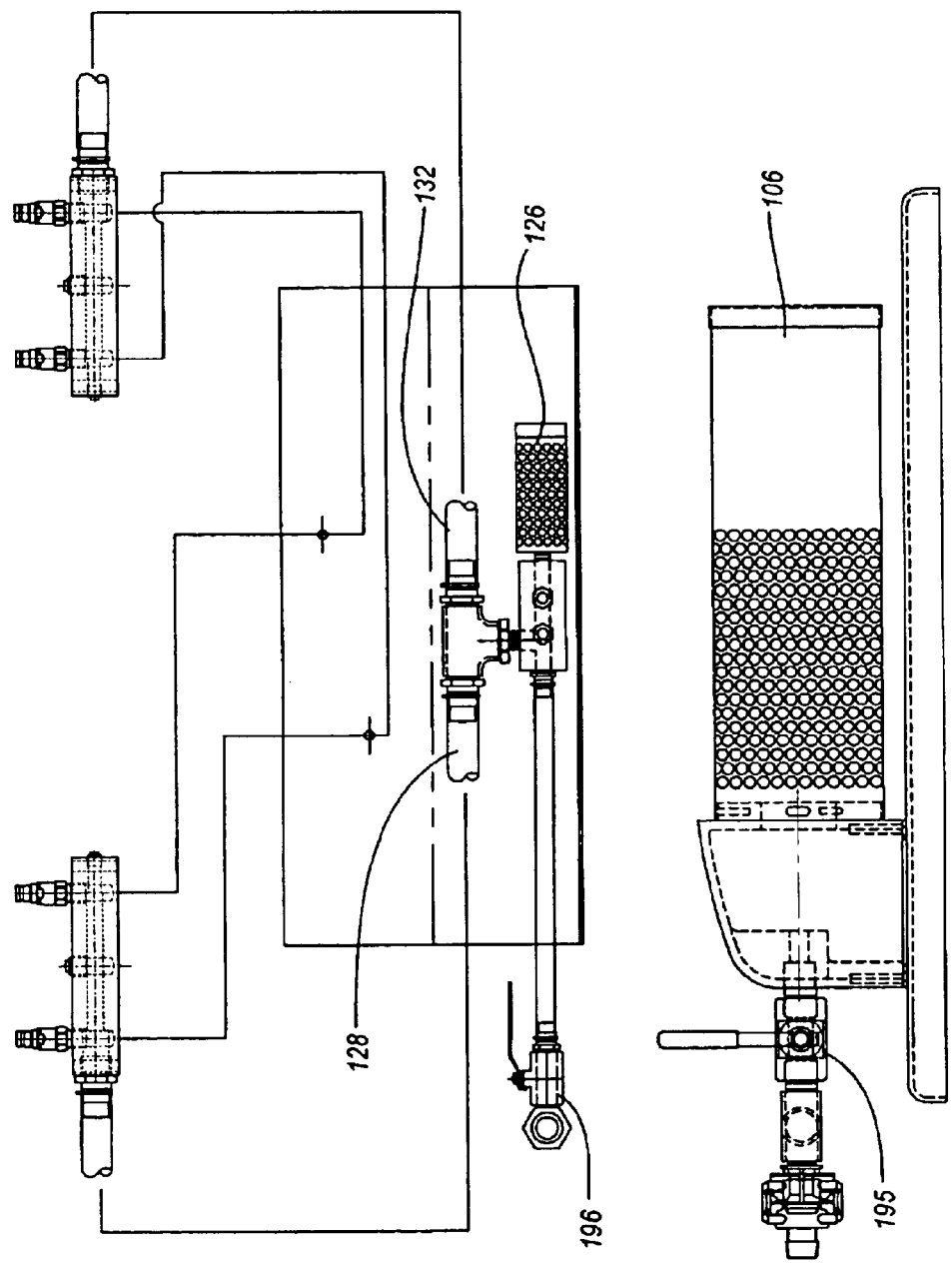
FIG. 4 is a side view of the vacuum assembly detail shown in FIG. 3 according to one embodiment of the present invention.

The first, second, and third vacuum generators 106, 126, 132 may also be manifolded together such that each may provide suction to all of the defueling fittings 116, 118, 120, 122 if necessary. A detail of the vacuum assembly 104 is shown in FIGS. 3–4 with one example of how the first, second, and third vacuum generators 106, 126, 132 may be interconnected. According to FIGS. 3–4, the second vacuum generator 126 branches off to the first (and/or third) vacuum line 128, and the third vacuum generator 132 branches off to the second (and/or fourth) vacuum line 130. However, a manifold 194 downstream of the branches to the vacuum lines 128, 130 facilitates selective fluid communication between the first, second and third vacuum generators 106, 126, 132. A first vacuum generator valve 195, a second vacuum generator valve 196, and a third vacuum generator valve 198 may be opened to fluidly connect the first, second, and third vacuum generators 106, 126, 132.

Referring again to FIGS. 1–2, each of the defueling hoses 108, 110, 112, 114 may be coiled around and stored on an associated hanger 138, 140, 142, 144 when not in use or at other times. As shown in FIG. 1, each of the hangers 138, 140, 142, 144 comprises a rigid, angled arm that is generally V-shaped.

Each of the defueling hoses 108, 110, 112, 114 empties into a collection chamber 146 of the vacuum fuel tank 102 through associated flow dissipation nozzles 147. The collection chamber 146 is at least partially inside the vacuum fuel tank 102 as shown. Fuel collected in the collection chamber 146 then flows through an angled flow disbursement tube 148 toward a bottom portion 150 of the vacuum fuel tank 102. Therefore, the vacuum fuel tank 102 fills from the bottom. The angled flow disbursement tube 148 is angled at least five degrees from vertical, preferably ten degrees or more. The angled flow disbursement tube 148 prevents collected fuel from free falling through the fuel vacuum tank, especially from free falling more than six inches. Free falling fluids can sometimes generate static electricity, which is undesirable when handling flammable liquids.

The vacuum fuel tank 102 may include one or more internal baffles 152 to prevent collected fuel from sloshing within the tank. The vacuum fuel tank 102 may also include an access port 154, shown in the open position in FIG. 1. A plurality of wheels 156 facilitates convenient transport of the bowser 100 from place to place.

Figure 5:
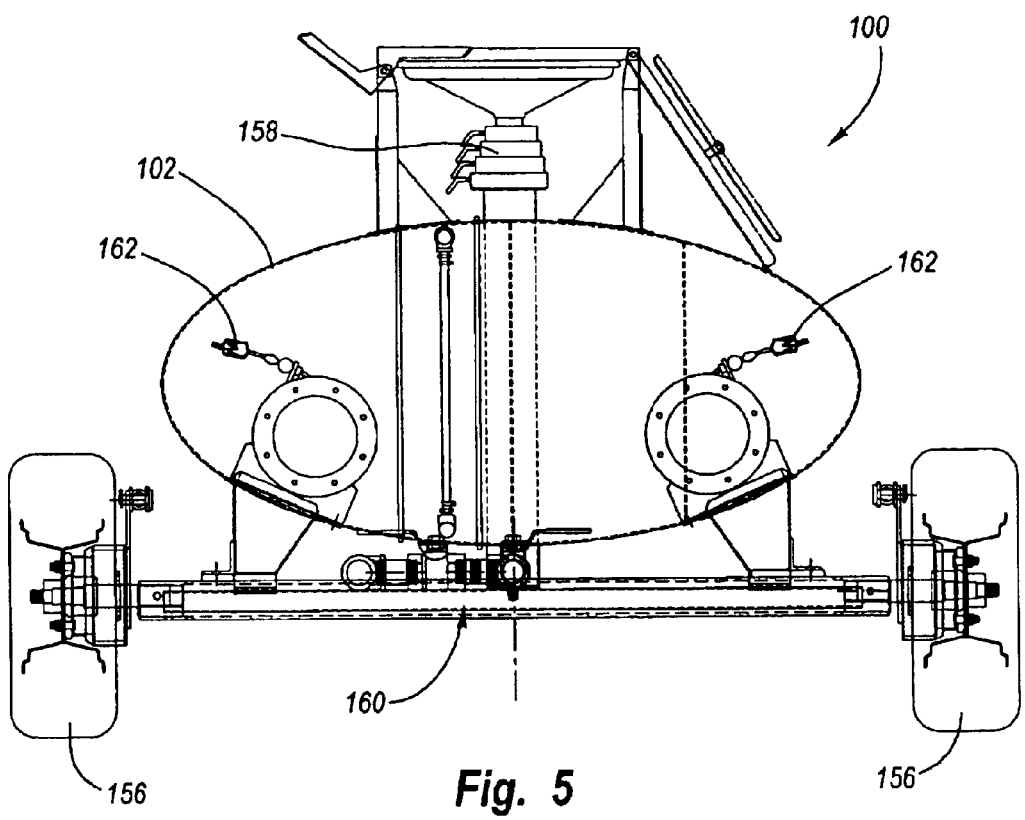
FIG. 5 is a first end view of the aircraft defueling apparatus of FIG. 1 according to one embodiment of the present invention.
Figure 6:
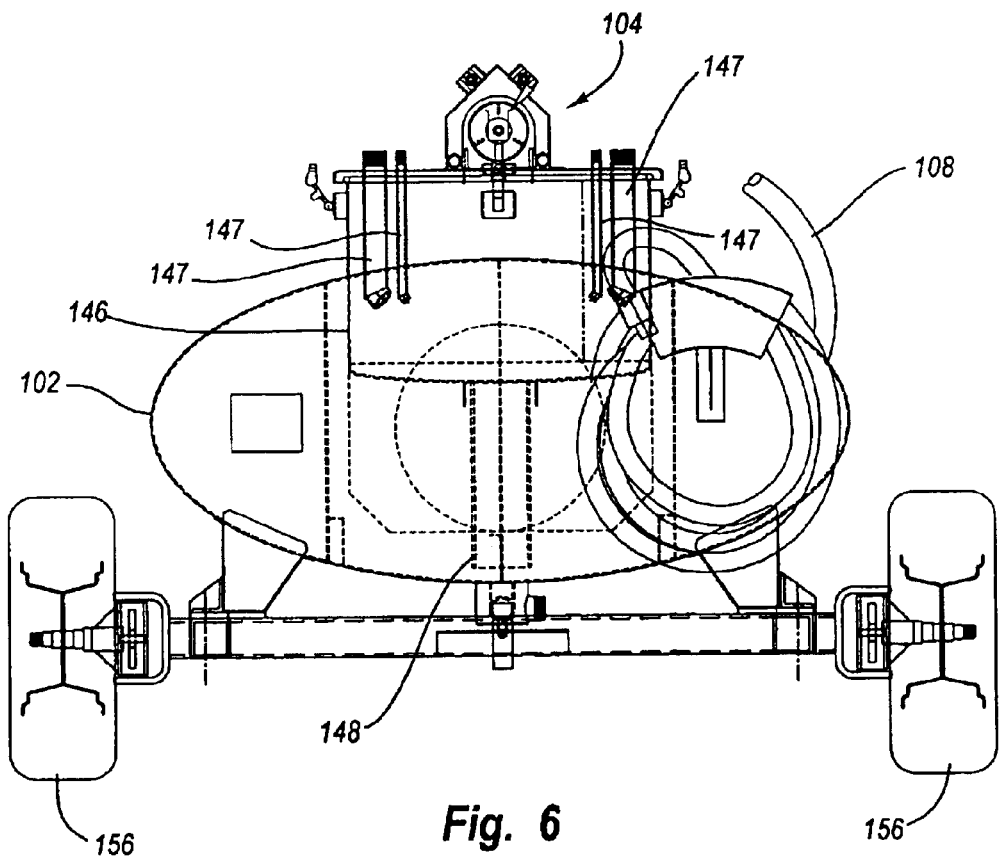
FIG. 6 is a second end view of the aircraft defueling apparatus of FIG. 1 according to one embodiment of the present invention.

FIGS. 5–6 illustrate opposing end views of the bowser 100, including electrical grounds 162 shown in FIG. 5 and the first hose 108 coiled up in FIG. 6.

While the bowser 100 is shown in the figures with an integral vacuum assembly 104 for facilitating much faster defueling operations as compared to gravity fed defueling systems, the bowser 100 according to FIGS. 1–2 includes a gravity system as well. In some cases it may be inconvenient or impossible to use the defueling hoses 108, 110, 112, 114 to defuel an aircraft. Therefore, the bowser 100 also includes a telescoping funnel 158 attached to and extending at least partially through the vacuum fuel tank 102. The telescoping funnel 158 is shown in both extended and retracted positions in FIG. 1.

Generally, vacuum powered defuelers and gravity fed defuelers are separate from one another. This separation results from gravity fed assemblies usually creating open, fluid communication between the fuel holding tank and the atmosphere. If the fuel holding tank is open to atmosphere, then it cannot maintain vacuum pressure. However, the present invention as shown in FIGS. 1–2 also includes a valve assembly 160 in fluid communication with the telescoping funnel 158 for isolating the telescoping funnel from the vacuum fuel tank 102. The telescoping funnel 158 is open to atmosphere, which would normally prevent the vacuum fuel tank 102 from maintaining vacuum pressure supplied by the first vacuum generator 106. The valve assembly 160 facilitates use of the bowser 100 as both a vacuum system and a gravity fed system.

Figure 7:
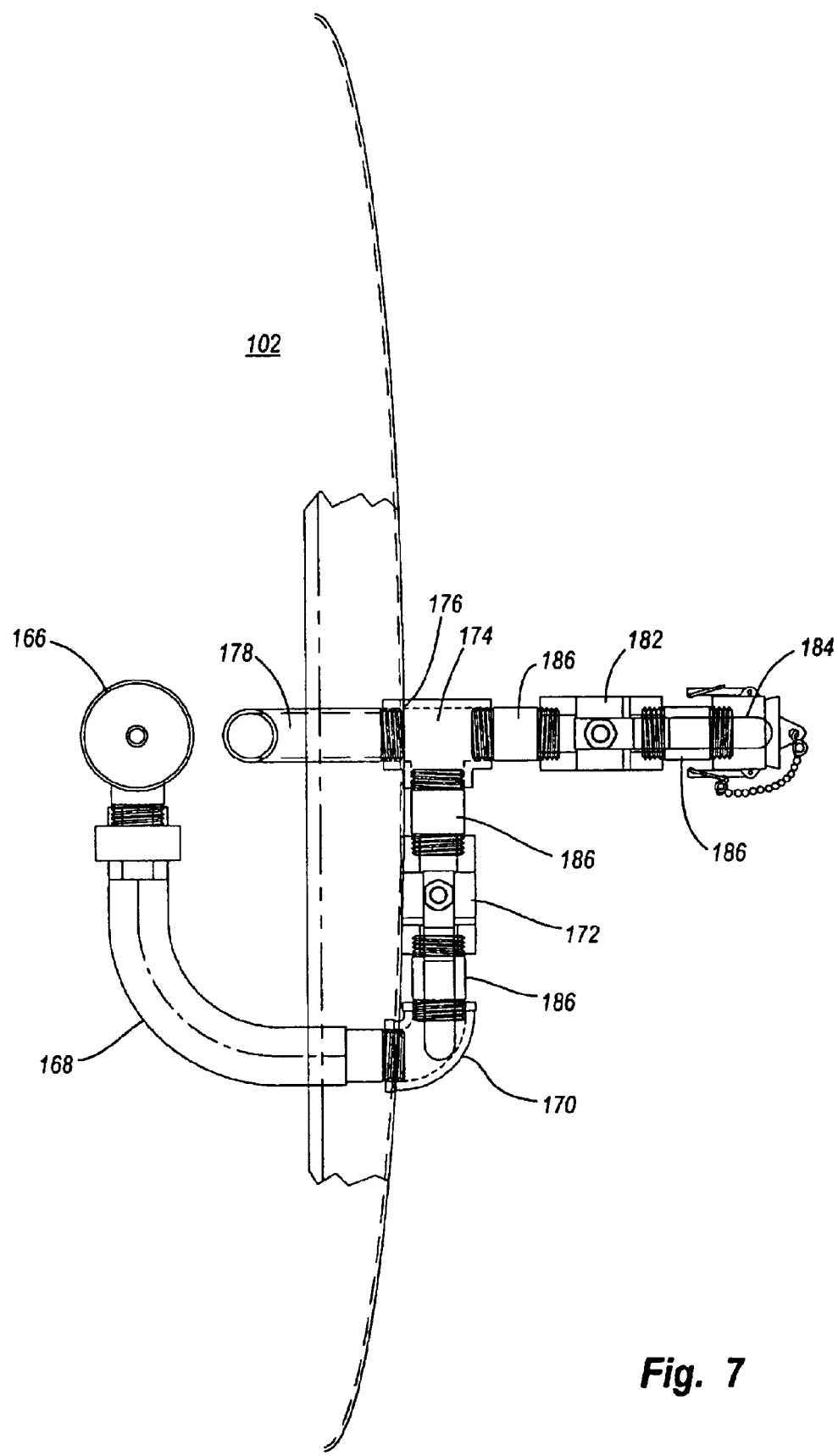
FIG. 7 is a bottom view of a telescopic funnel valving detail shown in FIG. 2 according to one embodiment of the present invention.
Figure 8:
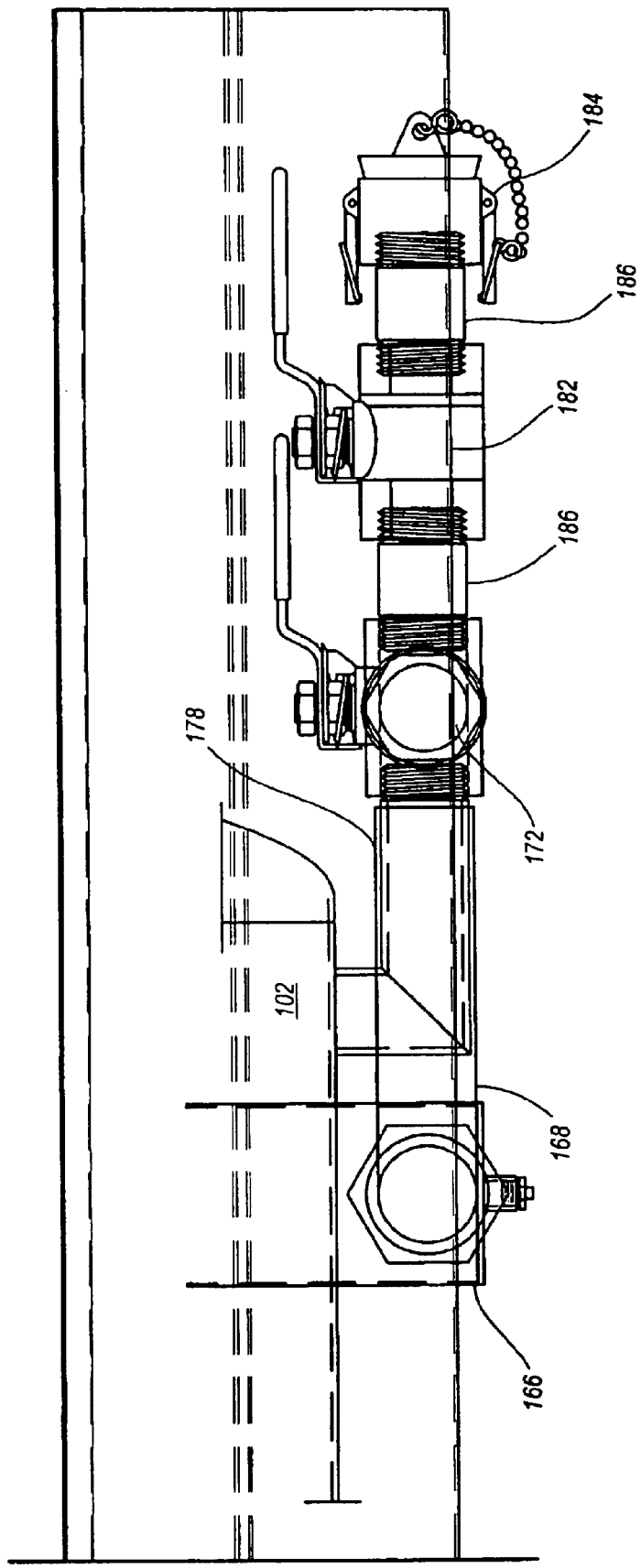
FIG. 8 is a side view of the of the telescopic funnel valving detail shown in FIG. 7 according to one embodiment of the present invention.

The valve assembly 160 is shown in more detail in FIGS. 7–8. As shown in FIGS. 7–8, the telescoping funnel 158 (FIG. 1) terminates at a base 166. However, the base 166 is not open to the vacuum fuel tank 102. Instead a first elbow 168 is tapped transversely into the base 166. The first elbow 168 extends from the base 166 inside the vacuum fuel tank 102 to a second elbow 170 outside of the vacuum fuel tank 102. A first valve 172 downstream of the first elbow 168 is threaded or otherwise attached to the second elbow 170 exterior to the vacuum fuel tank 102. By providing the first valve 172 outside of the vacuum fuel tank 102, operations personnel can conveniently access and toggle it. Opposite of the second elbow 170, the first valve 172 threads into or is otherwise attached to a T-fitting 174. A first outlet 176 of the T-fitting is connected to a return fitting 178 that reenters the vacuum fuel tank 102. A second outlet 180 of the T-fitting is connected to a second valve 182, and the second valve 182 is connected to a drain plug 184. Various sized pups 186 may be interconnected between the elbows, valves, drain, and T-fitting.

The return fitting 178 is open to and in fluid communication with the vacuum fuel tank 102. However, the first valve 172 fluidly isolates the telescoping funnel 158 from the vacuum valve tank 102. Therefore, the vacuum valve tank 102 is capable of maintaining vacuum pressure provided by the first vacuum generator 106 (FIG. 1) when first valve 172 is closed. Further, the vacuum fuel tank 102 may also be used with the telescoping funnel 158 to gravity feed the tank when the first valve 172 is open. In addition, the vacuum fuel tank 102 may be drained or pumped out to a larger or more permanent tank by opening the second valve 182 and the drain plug 184.

Figure 9:
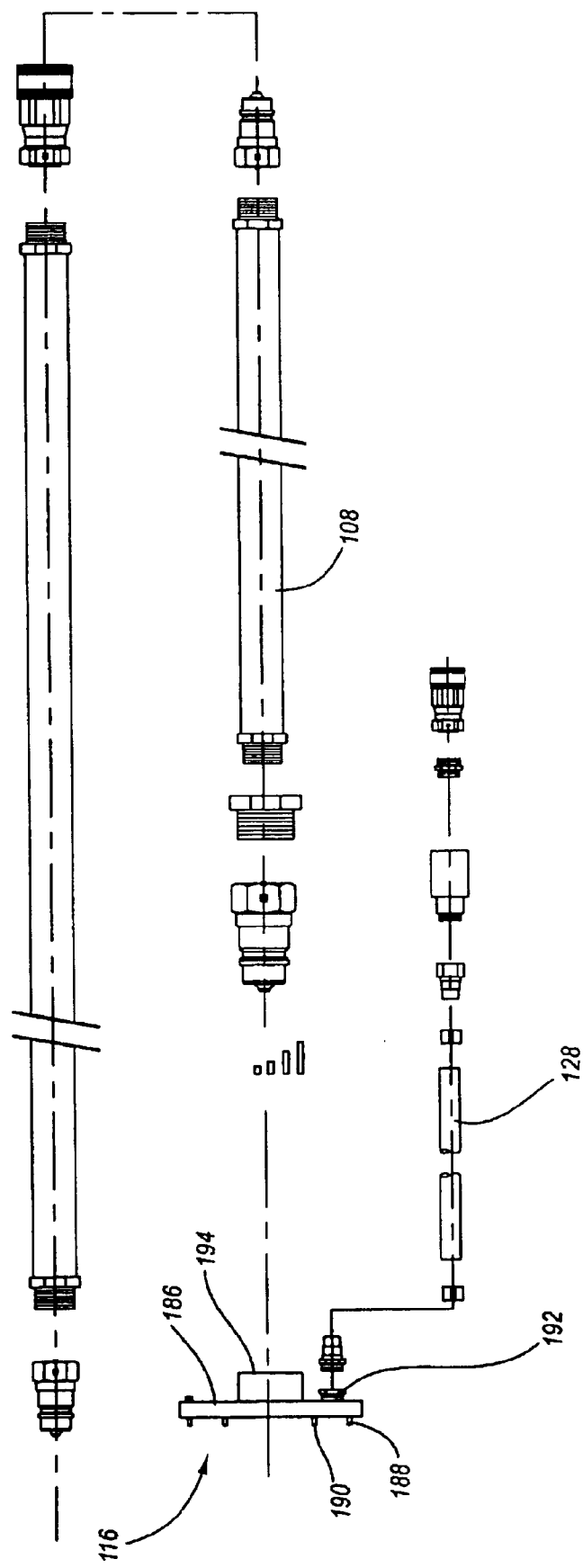
FIG. 9 is an assembly detail of a defueling fitting shown in FIG. 1 according to one embodiment of the present invention.

Referring next to FIG. 9, a detail assembly view of the defueling fitting 116 and associated piping is shown. The defueling fitting 116 comprises a suction cup, preferable formed into a rigid plate 186. The plate 186 is made of aluminum or other structural materials. The plate 186 includes a first or drain port 194 for fluidly connecting an aircraft drain valve to the one of the defueling hoses 108, 110, 112, 114. The plate 186 also includes a first outer circumferential seal 188 and a second inner seal 190. The vacuum line 128 provides vacuum pressure through a second hole or vacuum port 192 in the plate 186. The vacuum pressure provides suction between the first outer circumferential seal 188 and the second inner seal 190 to connect the plate 186 to an aircraft adjacent to a fuel drain valve.

Continuing to refer to FIG. 9, the defueling hose 108 providing vacuum pressure through the drain port 194 to draw fuel from an aircraft fuel tank. However, fuel drawn from an aircraft fuel tank is isolated from the vacuum line 128 by the second inner seal 190. Various other fittings and connectors may also be used with both the vacuum line 128 and the defueling hose 108 as shown. Each of the other defueling hoses 110, 112, 114 and vacuum lines 130, 132, 134 is similar or identical to the illustration of FIG. 7.

According to principles of the present invention, an aircraft may be defueled by attaching one or more of the defueling fittings 116, 118, 120, 122 over associated aircraft drain valves, and drawing fuel from the aircraft drain valves through the vacuum hoses 128, 130, 132, 134 attached to the defueling fittings 116, 118, 120, 122. Moreover, the vacuums for attaching the defueling fittings 116, 118, 120, 122 to the aircraft and the vacuum for drawing fuel from the aircraft may be operated independently of one another.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the scope of the invention.

What is claimed is:

1. An aircraft defueling apparatus, comprising:
   a vacuum fuel tank comprising a first non-manual vacuum generator;
   a first defueling hose in fluid communication with the vacuum fuel tank;
   a first defueling fitting attached to the first defueling hose;
   a second non-manual vacuum generator operatively connected to the first defueling fitting.

2. An aircraft defueling apparatus comprising:
   a vacuum fuel tank comprising a first vacuum generator;
   a first defueling hose in fluid communication with the vacuum fuel tank;

a first defueling fitting attached to the first defueling hose;
a second vacuum generator operatively connected to the first defueling fitting;
a second defueling hose in fluid communication with the vacuum fuel tank;
a second defueling fitting attached to the second defueling hose;
a third vacuum generator operatively connected to the second defueling fitting.

3. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a second defueling hose in fluid communication with the vacuum fuel tank;
a second defueling fitting attached to the second defueling hose;
a third vacuum generator operatively connected to the second defueling fitting;
a third defueling hose in fluid communication with the vacuum fuel tank;
a third defueling fitting attached to the third defueling hose, the third defueling fitting operatively connected to the second vacuum generator.

4. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a second defueling hose in fluid communication with the vacuum fuel tank;
a second defueling fitting attached to the second defueling hose;
a third vacuum generator operatively connected to the second defueling fitting;
a third defueling hose in fluid communication with the vacuum fuel tank;
a third defueling fitting attached to the third defueling hose, the third defueling fitting operatively connected to the second vacuum generator;
a fourth defueling hose in fluid communication with the vacuum fuel tank;
a fourth defueling fitting attached to the fourth defueling hose, the fourth defueling fitting operatively connected to the third vacuum generator.

5. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a collection chamber disposed at least partially in the vacuum fuel tank;
an angled fuel flow disbursement tube in fluid communication with the collection chamber for preventing fluid freefall of fuel collected in the collection chamber to a bottom portion of the vacuum fuel tank.

6. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a collection chamber disposed at least partially in the vacuum fuel tank;
a fuel flow disbursement tube angled at least 10 degrees with respect to vertical in fluid communication with the collection chamber for preventing fluid freefall of fuel collected in the collection chamber to a bottom portion of the vacuum fuel tank.

7. An aircraft defueling apparatus comprising
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a telescoping funnel attached to and extending at least partially through the vacuum fuel tank.

8. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a telescoping funnel attached to and extending at least partially through the vacuum fuel tank;
a valve assembly in fluid communication with the telescoping funnel for isolating the telescoping funnel from the vacuum fuel tank.

9. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a telescoping funnel attached to and extending at least partially through the vacuum fuel tank;
a valve assembly in fluid communication with the telescoping funnel for isolating the telescoping funnel from the vacuum fuel tank;
wherein the valve assembly comprises a first valve for isolating the telescoping funnel from the vacuum fuel tank and a second valve for selectively directing fluid flow from the vacuum fuel tank through a vacuum fuel tank drain port.

10. An aircraft defueling comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a telescoping funnel attached to and extending at least partially through the vacuum fuel tank;

a valve assembly in fluid communication with the telescoping funnel;
wherein the valve assembly comprises:
a first elbow tapped transversely into a base of the telescoping funnel and extending outside of the vacuum fuel tank;
a first valve downstream of the first elbow and outside of the vacuum fuel tank for selectively isolating the telescoping funnel from the vacuum fuel tank and fluidly connecting the telescoping funnel to the vacuum fuel tank;
a second valve downstream of the first valve for selectively draining the vacuum fuel tank.

11. An aircraft defueling apparatus comprising:
a vacuum fuel tank comprising a first vacuum generator;
a first defueling hose in fluid communication with the vacuum fuel tank;
a first defueling fitting attached to the first defueling hose;
a second vacuum generator operatively connected to the first defueling fitting;
a telescoping funnel attached to and extending at least partially through the vacuum fuel tank;
a valve assembly in fluid communication with the telescoping funnel;
wherein the valve assembly comprises:
a first elbow tapped transversely into a base of the telescoping funnel and extending outside of the vacuum fuel tank;
a first valve downstream of the first elbow and outside of the vacuum fuel tank for selectively isolating the telescoping funnel from the vacuum fuel tank and fluidly connecting the telescoping funnel to the vacuum fuel tank;
a second valve downstream of the first valve for selectively draining the vacuum fuel tank;
a return fitting downstream of the first valve extending into the vacuum fuel tank and fluidly connecting the first and second valves to the vacuum fuel tank.

12. A mobile fuel bowser, comprising:
a holding tank;
a vacuum generator integral with and at least partially inserted into the holding tank, the vacuum generator, when operated, placing the holding tank in vacuum;
one or more hoses in fluid communication with the holding tank a defueling fitting attached to each of the one of the one or more hoses, the defueling fitting comprising a suction cup.

13. A mobile fuel bowser according to claim 12, further comprising:
vacuum line extending between the suction cup and the vacuum generator for providing suction to the suction cup.

14. A mobile fuel bowser according to claim 12, further comprising:
a vacuum line extending between the suction cup and the vacuum generator for providing suction to the suction cup;
wherein the suction cup comprises:
a rigid plate with a drain port attached to one of the one or more hoses;
a second hole in the rigid plate attached to the vacuum line;
wherein the drain hole and the second hole are isolated from one another by one or more seals.

15. A mobile fuel bowser according to claim 12 further comprising at least two vacuum generators at least partially inserted into the holding tank.

16. A mobile fuel bowser according to claim 12, further comprising:
a vacuum line extending between the suction cup and the vacuum generator for providing suction to the suction cup;
at least one additional vacuum generator, wherein one of the vacuum generators is operatively connected to the one or more hoses via the holding tank, and another of the vacuum generators is operatively connected to the suction cup via the vacuum line.

17. A mobile fuel bowser comprising:
a holding tank;
a vacuum assembly integral with and at least inserted into the holding tank, the vacuum assembly, when operated placing the holding tank in vacuum;
one or more hoses in fluid communication with the holding tank;
at least two hoses;
a defueling fitting attached to each of the at least two hoses, the defueling fitting comprising a suction cup;
a first vacuum line extending between the suction cup of a first of the at least two hoses and a second vacuum line extending between the suction cup of a second of the at least two hoses and the vacuum assembly for providing suction to the suction cup;
wherein the vacuum assembly comprises at least three vacuum generators, wherein a first of the at least three vacuum generators is operatively connected to the at least two hoses via the holding tank, a second of the at least three vacuum generators is operatively connected to the suction cup of the first of the at least two hoses via the first vacuum line, and a third of the at least three vacuum generators is operatively connected to the suction cup of the second of the at least two hoses via the second vacuum line.

18. A mobile fuel bowser comprising:
a holding tank;
a vacuum assembly integral with and at least partially inserted into the holding tank, the vacuum assembly, when operated, placing the holding tank in vacuum;
one or more hoses in fluid communication with the holding tank:
a telescoping funnel attached to and extending at least partially through the holding tank;
a valve assembly in fluid communication with the telescoping funnel for selectively fluidly isolating the telescoping funnel from the holding tank to maintain the vacuum in the holding tank.

19. A defueling apparatus, comprising:
a holding tank;
a first fuel drain hose in fluid communication with the holding tank;
a defueling fitting attached to the first fuel drain hose;
a vacuum line attached to the defueling fitting;
a first vacuum generator operatively connected to the holding tank for placing the holding tank at a lower pressure than atmosphere;
a second vacuum generator operatively connected to the defueling fitting for attaching the defueling fitting to a surface;
a telescoping funnel attached to and extending at least partially through the holding tank;
a valve assembly in fluid communication with the telescoping funnel for selectively isolating the telescoping funnel from the holding tank to maintain the lower pressure in the holding tank.

20. A defueling apparatus according to claim 19, further comprising:

a second fuel drain hose in fluid communication with the holding tank;

a second defueling fitting attached to the second fuel drain hose;

a second vacuum line attached to the defueling fitting;

a third vacuum generator operatively connected to the second defueling fitting via the second vacuum line for hermetically attaching the defueling fitting to a surface.

21. A method of defueling an aircraft, comprising:

providing a vacuum fuel tank, the vacuum fuel tank including a first non-manual vacuum generator;

providing a first defueling hose in fluid communication with the vacuum fuel tank;

providing a first defueling fitting attached to the first defueling hose;

providing a second non-manual vacuum generator operatively connected to the first defueling fitting;

opening an aircraft fuel drain;

directing fuel from the aircraft fuel drain through the first defueling hose and into the vacuum fuel tank.

22. A method of defueling an aircraft according to claim 21, further comprising lowering pressure inside the vacuum fuel tank below atmospheric with the first vacuum generator and applying vacuum suction to the first defueling fitting with the second vacuum generator.

23. A method of defueling an aircraft comprising:

providing a vacuum fuel tank, the vacuum fuel tank including a first vacuum generator;

providing a first defueling hose in fluid communication with the vacuum fuel tank;

providing a first defueling fitting attached to the first defueling hose;

providing a second vacuum generator operatively connected to the first defueling fitting;

opening an aircraft fuel drain;

directing fuel from the aircraft fuel drain through the first defueling hose and into the vacuum fuel tank;

lowering pressure inside the vacuum fuel tank below atmospheric with the first vacuum generator and applying vacuum suction to the first defueling fitting with the second vacuum generator providing a telescoping funnel attached to and extending at least partially through the vacuum fuel tank;

maintaining lower pressure inside the vacuum fuel tank by fluidly isolating the telescoping funnel from the vacuum fuel tank.

24. A method of defueling an aircraft comprising providing a vacuum fuel tank, the vacuum fuel tank including a first vacuum generator;

providing a first defueling hose in fluid communication with the vacuum fuel tank;

providing a first defueling fitting attached to the first defueling hose;

providing a second vacuum generator operatively connected to the first defueling fitting;

opening an aircraft fuel drain;

directing fuel from the aircraft fuel drain through the first defueling hose and into the vacuum fuel tank;

providing a second defueling hose in fluid communication with the vacuum fuel tank;

providing a second defueling fitting attached to the second defueling hose;

providing a third vacuum generator operatively connected to the second defueling fitting.

25. A method of defueling an aircraft comprising:

attaching a defueling fitting over an aircraft drain valve with vacuum suction generated by a first non manual vacuum source;

drawing fuel from the aircraft drain valve and through a vacuum hose attached to the defueling fitting;

wherein a vacuum of the vacuum hose is generated by a second non-manual vacuum source.

26. A method of defueling an aircraft according to claim 25, further comprising applying vacuum pressure to a tank connected to the vacuum hose with the second vacuum source.

27. A method of defueling an aircraft comprising:

attaching a defueling fitting, over an aircraft drain valve with vacuum suction generated by a first vacuum source;

drawing fuel from the aircraft drain valve and through a vacuum hose attached to the defueling fitting;

wherein a vacuum of the vacuum hose is generated by a second vacuum source;

attaching a second defueling fitting over a second aircraft drain valve with vacuum suction generated by a third vacuum source;

drawing fuel from the second aircraft drain valve and through a second vacuum hose attached to the second defueling fitting.

28. A method of defueling an aircraft according to claim 25, further comprising:

applying vacuum pressure to a tank connected to the vacuum hose with the second vacuum source;

filling the tank with fuel via the vacuum hose without allowing fuel entering the tank to freefall more than 6 inches.

29. A method of defueling an aircraft comprising:

attaching a defueling fitting over an aircraft drain valve with vacuum suction generated by a first vacuum source;

drawing fuel from the aircraft drain valve and through a vacuum hose attached to the defueling fitting;

wherein a vacuum of the vacuum hose is generated by a second vacuum source;

applying vacuum pressure to a tank connected to the vacuum hose with the second vacuum source;

providing a telescoping funnel attached to and extending at least partially through the tank;

maintaining vacuum pressure inside the tank by fluidly isolating the telescoping funnel from the tank.

30. A method of defueling an aircraft according to claim 25, further comprising isolating vacuum suction generated by the first vacuum source from vacuum hose pressure with a circumferential seal disposed in the defueling fitting.

* * * * *